(12) United States Patent
Kuo

(10) Patent No.: US 10,789,693 B2
(45) Date of Patent: Sep. 29, 2020

(54) SYSTEM AND METHOD FOR PERFORMING PRE-PROCESSING FOR BLENDING IMAGES

(71) Applicant: Perfect Corp., New Taipei (TW)

(72) Inventor: Chia-Chen Kuo, Taipei (TW)

(73) Assignee: PERFECT CORP., New Taipei (TW)

( * ) Notice: Subject to any disclaimer, the term of this patent is extended or adjusted under 35 U.S.C. 154(b) by 199 days.

(21) Appl. No.: 15/862,862

(22) Filed: Jan. 5, 2018

(65) Prior Publication Data
US 2018/0189938 A1    Jul. 5, 2018

Related U.S. Application Data

(60) Provisional application No. 62/442,605, filed on Jan. 5, 2017.

(51) Int. Cl.
| | |
|---|---|
| G06K 9/36 | (2006.01) |
| G06T 5/50 | (2006.01) |
| G06K 9/00 | (2006.01) |
| G06K 9/46 | (2006.01) |
| G06T 11/00 | (2006.01) |
| G06T 7/33 | (2017.01) |
| G06T 5/00 | (2006.01) |

(52) U.S. Cl.
CPC .............. *G06T 5/50* (2013.01); *G06K 9/0061* (2013.01); *G06K 9/00268* (2013.01); *G06K 9/46* (2013.01); *G06T 5/005* (2013.01); *G06T 7/33* (2017.01); *G06T 11/00* (2013.01); *G06T 2207/10024* (2013.01); *G06T 2207/20221* (2013.01); *G06T 2207/30201* (2013.01)

(58) Field of Classification Search
CPC ... G06T 5/50; G06T 11/00; G06T 7/33; G06T 5/005; G06T 2207/10024; G06T 2207/20221; G06T 2207/30201; G06K 9/0061; G06K 9/46; G06K 9/00268
See application file for complete search history.

(56) References Cited

U.S. PATENT DOCUMENTS

| | | | |
|---|---|---|---|
| 8,072,507 B2* | 12/2011 | Fuh ........................ | G06T 5/009 348/229.1 |
| 8,933,965 B2* | 1/2015 | Tomite .................... | G06T 15/50 345/633 |
| 9,131,201 B1* | 9/2015 | Geiss ...................... | H04N 5/235 |
| 9,398,235 B2 | 7/2016 | Bae et al. | |
| 2005/0031173 A1* | 2/2005 | Hwang .............. | G06K 9/00597 382/118 |
| 2006/0114265 A1 | 6/2006 | Nishida | |
| 2007/0086652 A1* | 4/2007 | Park ........................ | G06T 5/008 382/167 |

(Continued)

*Primary Examiner* — Samir A Ahmed
(74) *Attorney, Agent, or Firm* — McClure, Qualey & Rodack, LLP

(57) ABSTRACT

A computing device for performing image pre-processing for blending images receives a first image depicting a head. The computing device detects a portion of the head in the first image and calculates an image attribute of the portion in the first image. The computing device receives a second image and generates an adjusted second image by adjusting color pixels in the second image based on the calculated image attribute of the portion in the first image. The computing device blends the adjusted second image with the first image.

12 Claims, 7 Drawing Sheets

(56) References Cited

U.S. PATENT DOCUMENTS

| | | | | |
|---|---|---|---|---|
| 2008/0030516 A1* | 2/2008 | Haghighi | ............... | G06Q 30/00 345/581 |
| 2012/0170027 A1* | 7/2012 | Tsukizawa | ................ | G06T 1/00 356/124 |
| 2014/0354947 A1* | 12/2014 | Hsieh | ................... | G02C 13/003 351/204 |
| 2015/0279113 A1* | 10/2015 | Knorr | .................. | H04N 13/239 345/633 |
| 2016/0217609 A1* | 7/2016 | Kornilov | ................ | G06T 15/60 |

\* cited by examiner

SYSTEM AND METHOD FOR PERFORMING PRE-PROCESSING FOR BLENDING IMAGES

CROSS-REFERENCE TO RELATED APPLICATION

This application claims priority to, and the benefit of, U.S. Provisional Patent Application entitled, "System and Method for Performing Image Pre-Processing for Blending," having Ser. No. 62/442,605, filed on Jan. 5, 2017, which is incorporated by reference in its entirety.

TECHNICAL FIELD

The present disclosure generally relates to editing multimedia content and more particularly, to pre-processing techniques for blending images.

BACKGROUND

With the proliferation of smartphones, tablets, and other display devices, people have the ability to take or display digital images virtually any time. Smartphones and other portable display devices are commonly used for a variety of applications, including both business and personal applications. Certain application programs have become popular that allow users to modify images containing pictures of the user or other people. Devices may be used to capture or receive digital images (either still images or video images) containing an image of the user's face. The ability to incorporate or blend content from another image into a target image is an increasingly-popular feature in media applications, where a graphical effect or image is selectable by a user and applied to the target image. However, one perceived shortcoming of various existing applications is that due to variation in the lighting and the luminance range of respective scenes of the captured images being blended, the blended result can appear unnatural due to inconsistent dynamic ranges across the blended images, thereby detracting from the realism of the blended result. Therefore, it is desirable to provide an improved technique for blending images.

SUMMARY

Systems and methods for performing pre-processing for blending images are disclosed. In a first embodiment, a computing device for performing image pre-processing for blending images receives a first image depicting a head. The computing device detects a portion of the head in the first image and calculates an image attribute of the portion in the first image. The computing device receives a second image and generates an adjusted second image by adjusting color pixels in the second image based on the calculated image attribute of the portion in the first image. The computing device blends the adjusted second image with the first image.

Another embodiment is a system that comprises a display, a memory device storing instructions, and a processor coupled to the memory device. The processor is configured by the instructions to receive a first image depicting a face, detect an eye region on the face in the first image, and calculate a dynamic range of the eye region in the first image. The processor is further configured to receive a second image, generate an adjusted second image by adjusting a contrast of the second image based on the calculated dynamic range of the eye region in the first image, and blend the adjusted second image with the first image.

Another embodiment is a non-transitory computer-readable storage medium storing instructions to be implemented by a computing device having a processor. The instructions, when executed by the processor, cause the computing device to receive a first image depicting a face, detect an eye region on the face in the first image, and calculate a dynamic range of the eye region in the first image. The computing device is further configured by the instructions to receive a second image, generate an adjusted second image by adjusting a contrast of the second image based on the calculated dynamic range of the eye region in the first image, and blend the adjusted second image with the first image.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for processing images prior to blending the images in order to mitigate inconsistencies in the dynamic ranges across the images to be blended. A preferred embodiment achieves the technical effect of providing adaptive adjustment and refinement of the dynamic range of one or both of the images being blended, thereby resulting in improved blended images.

Figure 1:
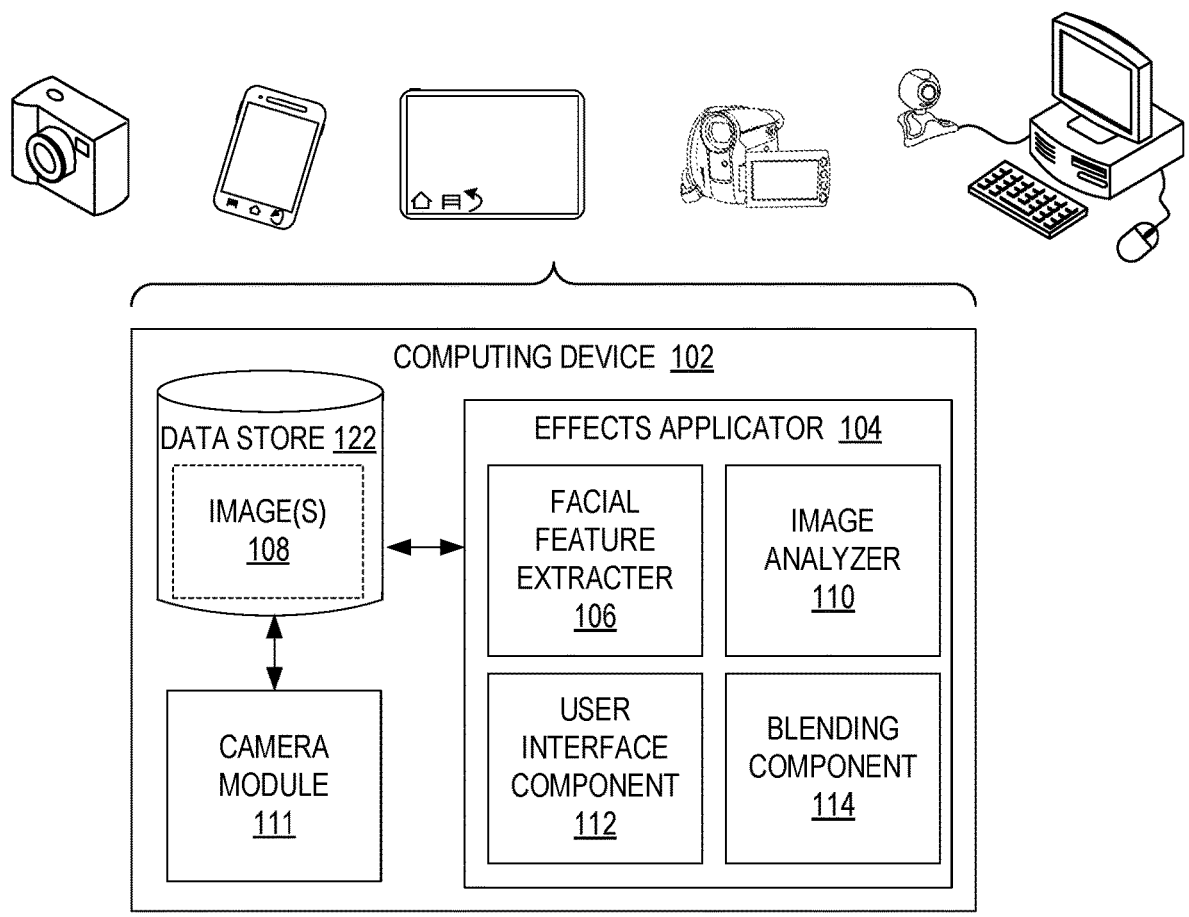
FIG. 1 is a block diagram of a computing device in which the pre-processing and blending techniques disclosed herein may be implemented in accordance with various embodiments.

FIG. 1 is a block diagram of a computing device 102 in which the pre-processing and blending techniques disclosed herein may be implemented. The computing device 102 may be embodied as a computing device equipped with digital content recording capabilities such as, but not limited to, a digital camera, a smartphone, a tablet computing device, a digital video recorder, a laptop computer coupled to a webcam, and so on.

An effects applicator 104 executes on a processor of the computing device 102 and includes various components including a facial feature analyzer 106, an image analyzer 110, a user interface component 112, and a blending component 114. The facial feature analyzer 106 is configured to analyze the content of digital images captured by the camera module 111 and/or received from a remote source. The facial feature analyzer 106 may be further configured to analyze content of digital images stored on a storage medium such as, by way of example and without limitation, a compact disc (CD), a universal serial bus (USB) flash drive, or cloud storage, wherein the digital images may then be transferred and stored locally on a data store 122 of the computing device 102.

The images 108 processed by the facial feature analyzer 106 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or other digital formats. Note that the digital images may also be extracted from media content encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

The user interface component 112 generates a user interface that allows the user to select a first image and a second image to be blended. The images 108 may be captured by the camera module 111 and/or retrieved from a source external to the computing device 102. The facial feature analyzer 106 identifies an eye region on a face depicted in the first image, where the second image is to be blended with the first image. It should be appreciated, however, that the concepts described herein are applicable to other regions/features of the first image as well and are not limited to the eye region. In this regard, one of ordinary skill in the art will readily appreciate and understand the applicability and implementation of the invention with other target features from the description provided herein.

For some embodiments, the eye region encompasses the eye white or the pupil of the eye depicted in the first image. Note that while the eye and the pupil of the eye are utilized, other portions or features of the eye may be utilized. When there are multiple faces depicted in the first image, the facial feature analyzer 106 may be configured to identify the eye region of each of the depicted faces.

The image analyzer 110 then calculates the dynamic range of the eye region in the first image by calculating a difference of luminance within the eye region encompassing the eye white of the eye and the pupil of the eye. If there are multiple faces depicted in the first image, the image analyzer 110 may be configured to calculate an average of the dynamic ranges values. The blending component 114 adaptively adjusts the contrast of the second image based on the dynamic range value derived by the image analyzer 110 and then blends the adjusted second image with the first image. For some embodiments, the image analyzer 110 determines whether the contrast of the second image differs from the dynamic range of the first image by a threshold amount, where the image analyzer 110 calculates the dynamic range of the eye region in the first image and the blending component 114 generates the adjusted second image only if the contrast of the second image differs from the dynamic range of the first image by the threshold amount.

Figure 2:
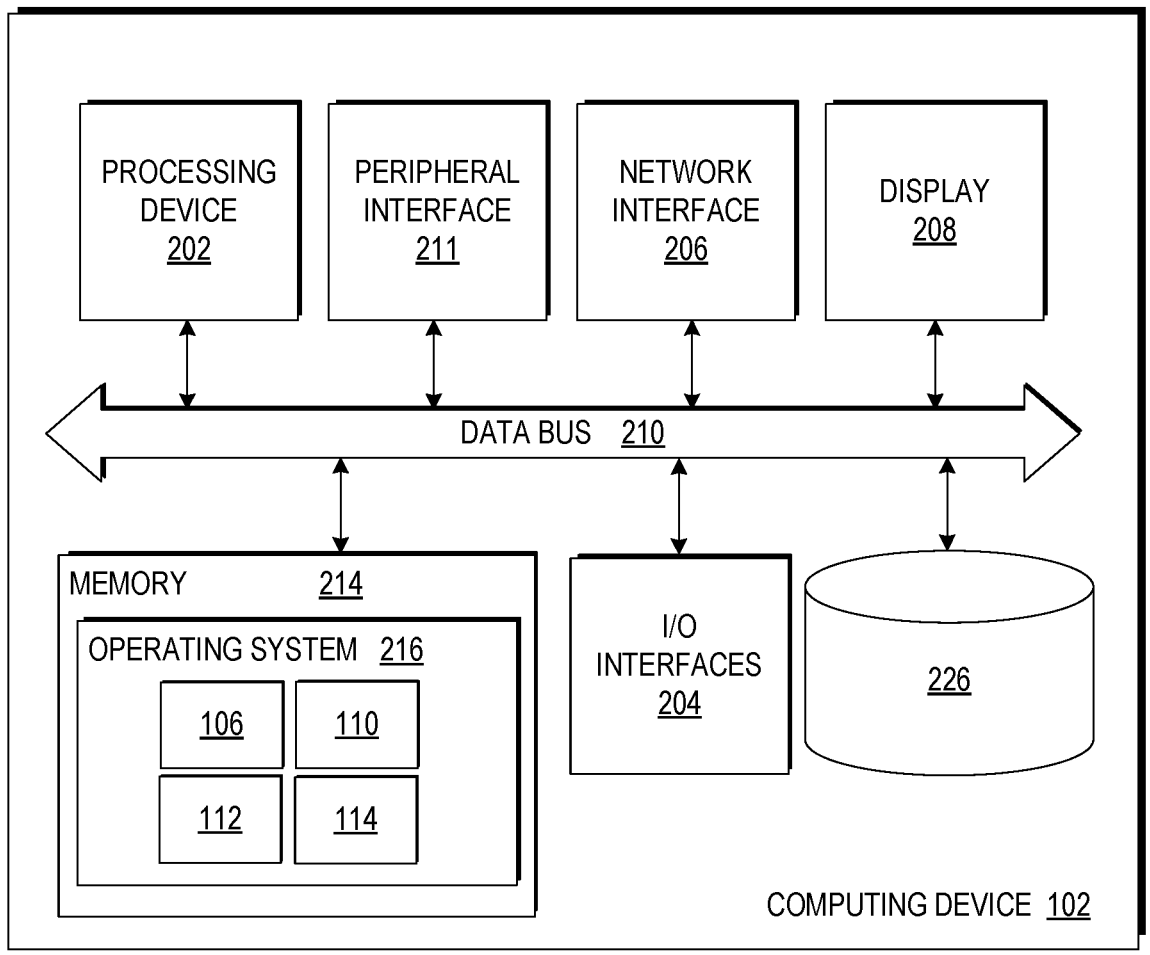
FIG. 2 illustrates a schematic block diagram of the computing device in FIG. 1 in accordance with various embodiments.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multi-processor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions relating to the techniques disclosed herein. One of ordinary skill in the art will appreciate that the memory 214 can, and typically will, comprise other components which have been omitted for purposes of brevity.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
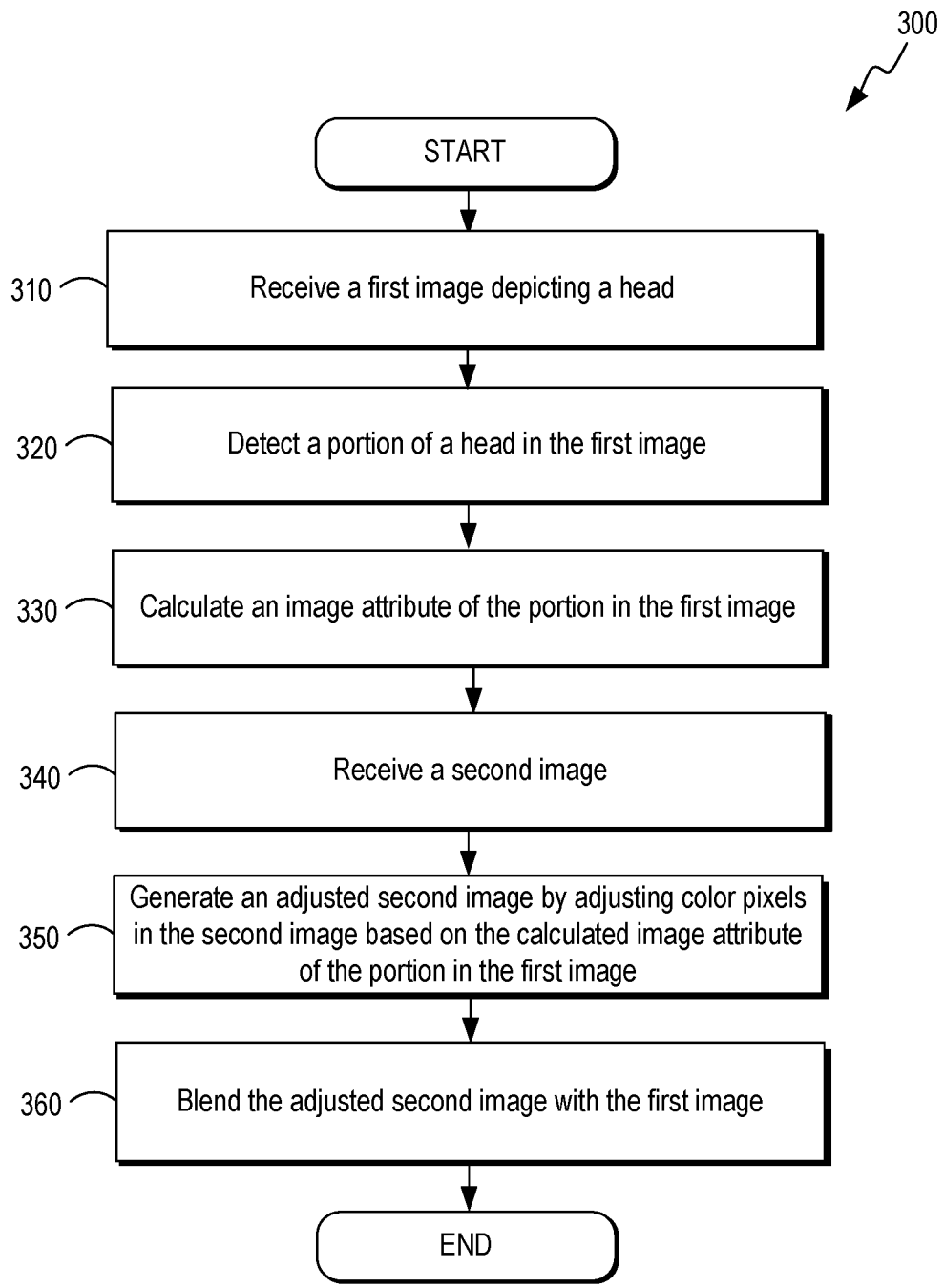
FIG. 3 is a flowchart for performing pre-processing and blending operations utilizing the computing device of FIG. 1 in accordance with various embodiments.

Reference is made to FIG. 3, which is a flowchart 300 of operations executed by the computing device 102 in FIG. 1 for performing the pre-processing and blending techniques disclosed herein. It is understood that the flowchart 300 of FIG. 3 provides merely an example of the different types of functional arrangements that may be employed to implement the operation of the various components of the computing device 102 in FIG. 1. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

To begin, in block 310, the computing device 102 receives a first image depicting a head. In block 320, the computing device 102 detects a portion of a head in the first image. For some embodiments, this comprises applying facial alignment processing and extracting positions of facial features relative to the facial alignment processing, identifying locations of eye feature points among the facial features, and defining the eye region based on the locations of the eye feature points with respect to the facial alignment processing. For some embodiments, defining the eye region further comprises identifying an eye white and identifying a pupil of the eye among the identified eye feature points, where the eye region encompasses both the eye white and the pupil of the eye.

Figure 7:
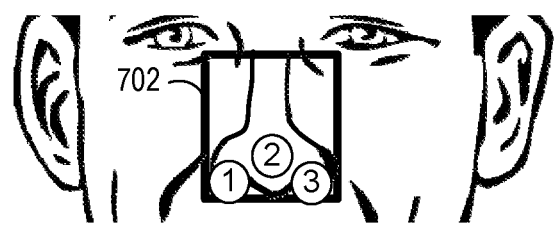
FIG. 7 illustrates derivation of a nose region in accordance with various embodiments.

For other embodiments, detecting a portion of a head in the first image further comprises applying facial alignment processing and extracting positions of facial features relative to the facial alignment processing, identifying locations of nose feature points among the facial features, and defining the nose region based on the locations of the nose feature points with respect to the facial alignment processing. For some embodiments, defining the nose region further comprises identifying a nose tip and identifying a nostril among the identified nose feature points, where the nose region encompasses both the nose tip of the nose and the nostril of the nose. Referring briefly to FIG. 7, a nose region 702 comprising a rectangular region is shown that includes the both the nose tip (point "2") and the nostrils (points "1" and "3") of the nose.

Referring back to FIG. 3, in block 330, the computing device 102 calculates an image attribute of the portion in the first image. For some embodiments, this comprises performing one or more of the following operations: calculating a dynamic range of the portion, calculating a contrast level of the portion, calculating a brightness level of the portion, calculating a saturation level of the portion, or calculating a sharpness level of the portion. For some embodiments, calculating the dynamic range of the portion in the first image further comprises one or more of the following operations: calculating a difference of luminance within the eye region encompassing the eye white of the eye and the pupil of the eye, or calculating a difference of luminance within the nose region encompassing the nose tip of the nose and the nostril of the nose. For some embodiments, calculating the sharpness level of the portion in the first image further comprises one or more of the following operations: calculating a maximum gradient within the eye region encompassing the eye white of the eye and the pupil of the eye, or calculating a maximum gradient within the nose region encompassing the nose tip of the nose and the nostril of the nose.

In block 340, the computing device 102 receives a second image, and in block 350, the computing device 102 generates an adjusted second image by adjusting color pixels in the second image based on the calculated image attribute of the portion in the first image. In block 360, the computing device 102 blends the adjusted second image with the first image. Thereafter, the process in FIG. 3 ends.

Figure 4:
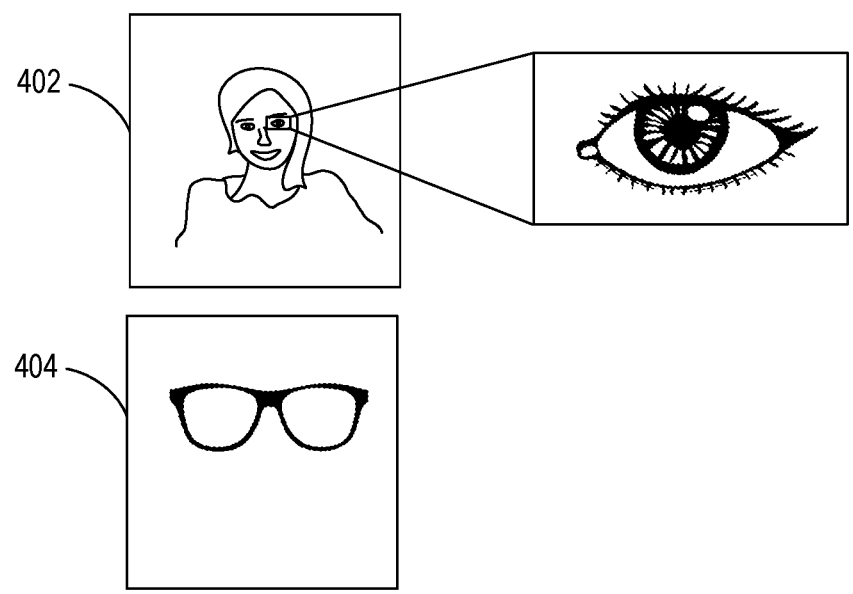
FIG. 4 illustrates the use of facial alignment processing for identifying an eye region in a first image in accordance with various embodiments.

To further illustrate various functions of the algorithm discussed in connection with the flowchart of FIG. 3, reference is made to FIGS. 4-6. To begin, the user interface component 112 (FIG. 1) generates a user interface that facilitates the selection of a first image 402 and a second image 404 as shown in FIG. 4, where the user wishes to blend the second image 404 with the first image 402. In the example shown in FIG. 4, the user wishes to superimpose a pair of sunglasses depicted in the second image 404 onto the individual's face depicted in the first image 402.

Figure 5:
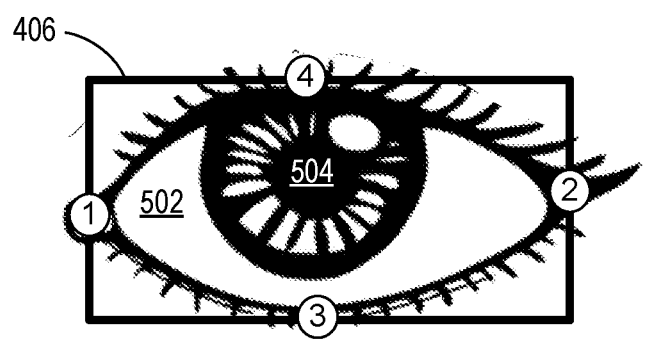
FIG. 5 illustrates derivation of an eye region and calculation of the dynamic range for the eye region in the first image in FIG. 4 in accordance with various embodiments.
Figure 6:
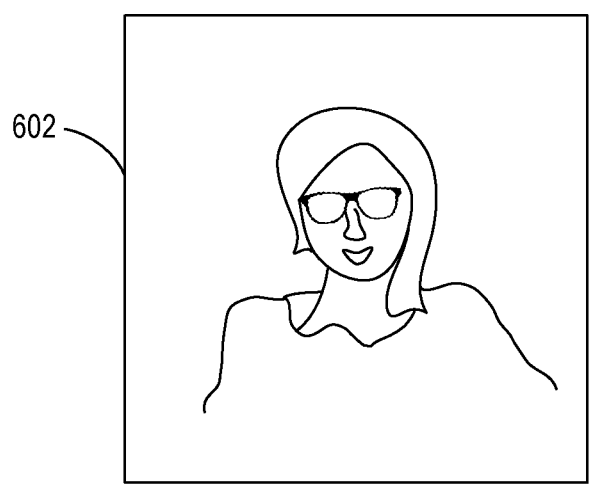
FIG. 6 illustrates blending of the first image and an adjusted second image in accordance with various embodiments.

With reference to FIG. 5, the facial feature analyzer 106 (FIG. 1) detects an eye region 406 on the face in the first image 402. In accordance with some embodiments, the facial feature analyzer 106 detects the eye region by applying facial alignment processing and extracting positions of facial features relative to the facial alignment processing. In the example shown, the locations of four feature points are identified. Note, however, that any number of features points may be utilized for identifying the eye region 406. The facial feature analyzer 106 identifies locations of eye feature points among the facial features and defines the eye region 406 based on the locations of the eye feature points with respect to the facial alignment processing. For example, the locations of the pupil portion 504 and the eye white 502 of the eye region 406 may be identified by the facial feature analyzer 106, as shown in FIG. 5. In the example shown, the eye region 406 comprises a rectangular region that includes the pupil portion 504 and the eye white 502.

The image analyzer 110 (FIG. 1) then calculates a dynamic range of the eye region 406 in the first image 402. The blending component 114 (FIG. 1) generates an adjusted second image 404 by adjusting a contrast of the second image 404 based on the calculated dynamic range of the eye region in the first image. For some embodiments, the blending component 114 adjusts the contrast of the second image 404 based on the following. First, the dynamic range calculated based on the value of the eye white region is calculated as white_level=min(255, eye_white+50), where eye_white is a representative pixel value of the white of the eye. For some embodiments, the average pixel value of the pixels within the pupil of the eye may be used for the representative pixel value. The value of the pupil of the eye (black_level) is calculated as black_level=eye_black, where eye_black is a representative pixel value of the pupil of the eye. Similarly, the average pixel value of the pixels within the pupil of the eye may be used for the representative pixel value. The adjusted contrast level of the second image 404 is then calculated as: adjusted_rgb=black_level+original_rgb×(white_level−black_level)/255, where original_rgb represents the original contrast level of the second image 404. The blending component 114 then blends the adjusted second image 404 with the first image 402, as shown in FIG. 6.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a display;
a memory device storing instructions; and
a processor coupled to the memory device and configured by the instructions to at least:
receive a first image depicting a face;
detect an eye region on the face in the first image;
calculate a dynamic range of a contrast of the eye region in the first image;
receive a second image;
generate an adjusted second image by adjusting a contrast of the second image based on the calculated dynamic range of the contrast of the eye region in the first image; and
blend the adjusted second image with the first image.

2. The system of claim 1, wherein the processor is further configured by the instructions to determine whether the contrast of the second image differs from the dynamic range of the first image by a threshold amount, wherein the processor calculates the dynamic range of the eye region in the first image and generates the adjusted second image only if the contrast of the second image differs from the dynamic range of the first image by the threshold amount.

3. The system of claim 1, wherein the processor detects the eye region in the first image by:
applying facial alignment processing and extracting positions of facial features relative to the facial alignment processing;
identifying locations of eye feature points among the facial features; and
defining the eye region based on the locations of the eye feature points with respect to the facial alignment processing.

4. The system of claim 3, wherein the processor defines the eye region by identifying an eye white and identifying a pupil of the eye among the identified eye feature points, wherein the eye region encompasses both the eye white and the pupil of the eye.

5. The system of claim 4, wherein the processor calculates the dynamic range of the eye region in the first image by calculating a difference of luminance within the eye region encompassing the eye white of the eye and the pupil of the eye.

6. The system of claim 5, wherein the processor generates the adjusted second image by adjusting a contrast level of the second image based on the calculated dynamic range of the eye region in the first image.

7. A non-transitory computer-readable storage medium storing instructions to be implemented by a computing device having a processor, wherein the instructions, when executed by the processor, cause the computing device to at least:
receive a first image depicting a face;
detect an eye region on the face in the first image;
calculate a dynamic range of a contrast of the eye region in the first image;
receive a second image;
generate an adjusted second image by adjusting a contrast of the second image based on the calculated dynamic range of the contrast of the eye region in the first image; and
blend the adjusted second image with the first image.

8. The non-transitory computer-readable storage medium of claim 7, wherein the processor is further configured by the instructions to determine whether the contrast of the second image differs from the dynamic range of the first image by a threshold amount, wherein the processor calculates the dynamic range of the eye region in the first image and generates the adjusted second image only if the contrast of the second image differs from the dynamic range of the first image by the threshold amount.

9. The non-transitory computer-readable storage medium of claim 7, wherein the processor detects the eye region in the first image by: applying facial alignment processing and extracting positions of facial features relative to the facial alignment processing; identifying locations of eye feature points among the facial features; and defining the eye region based on the locations of the eye feature points with respect to the facial alignment processing.

10. The non-transitory computer-readable storage medium of claim 9, wherein the processor defines the eye region by identifying an eye white and identifying a pupil of the eye among the identified eye feature points, wherein the eye region encompasses both the eye white and the pupil of the eye.

11. The non-transitory computer-readable storage medium of claim 10, wherein the processor calculates the dynamic range of the eye region in the first image by calculating a difference of luminance within the eye region encompassing the eye white of the eye and the pupil of the eye.

12. The non-transitory computer-readable storage medium of claim 11, wherein the processor generates the adjusted second image by adjusting a contrast level of the second image based on the calculated dynamic range of the eye region in the first image.

* * * * *